United States Patent [19]

Lampert

[11] 4,226,441
[45] Oct. 7, 1980

[54] AUXILIARY VEHICLE SPRING FOR LIGHTLY LOADED CONDITIONS

[75] Inventor: Albert J. Lampert, San Clemente, Calif.

[73] Assignee: Cambria Spring Company, Los Angeles, Calif.

[21] Appl. No.: 891,847

[22] Filed: Mar. 30, 1978

Related U.S. Application Data

[63] Continuation-in-part of Ser. No. 783,661, Apr. 1, 1977, Pat. No. 4,175,772.

[51] Int. Cl.³ .............................................. B60G 11/04
[52] U.S. Cl. ................................................... 280/718
[58] Field of Search .................... 267/45, 46, 54, 56; 280/718, 719

[56] References Cited

U.S. PATENT DOCUMENTS

| | | | |
|---|---|---|---|
| 1,632,993 | 6/1927 | Brush | 267/46 |
| 3,194,580 | 7/1965 | Hamlet | 280/718 X |
| 3,658,312 | 4/1972 | Scheublein | 267/54 R |
| 3,786,886 | 1/1974 | Bombardier | 267/56 |
| 4,175,772 | 11/1979 | Lampert | 280/718 |

FOREIGN PATENT DOCUMENTS

| | | | |
|---|---|---|---|
| 1123572 | 2/1962 | Fed. Rep. of Germany | 267/56 |
| 510678 | 1/1955 | Italy | 267/56 |
| 746322 | 3/1956 | United Kingdom | 280/718 |

*Primary Examiner*—John J. Love
*Assistant Examiner*—Norman L. Stack
*Attorney, Agent, or Firm*—Fulwider, Patton, Rieber, Lee & Utecht

[57] ABSTRACT

A vehicle suspension system in which an auxiliary spring having a lower spring rate than the mainspring provides a resilient ride under empty or lightly loaded conditions by urging the mainspring toward the lower limit of its vertical travel. The auxiliary spring, which can be added to an existing suspension system of conventional design, extends along the underside of the vehicle frame toward a hanger in which the mainspring is inserted. A sliding bracket with an anti-friction liner is carried by the auxiliary spring and engages the mainspring to reduce wear.

The size of the auxiliary spring is minimized by the use of multiple leaves. A pivoted attachment of the auxiliary spring permits its position to be adapted to the dimensions of a particular vehicle by varying the size or configuration of a spacer.

3 Claims, 3 Drawing Figures

U.S. Patent    Oct. 7, 1980    4,226,441
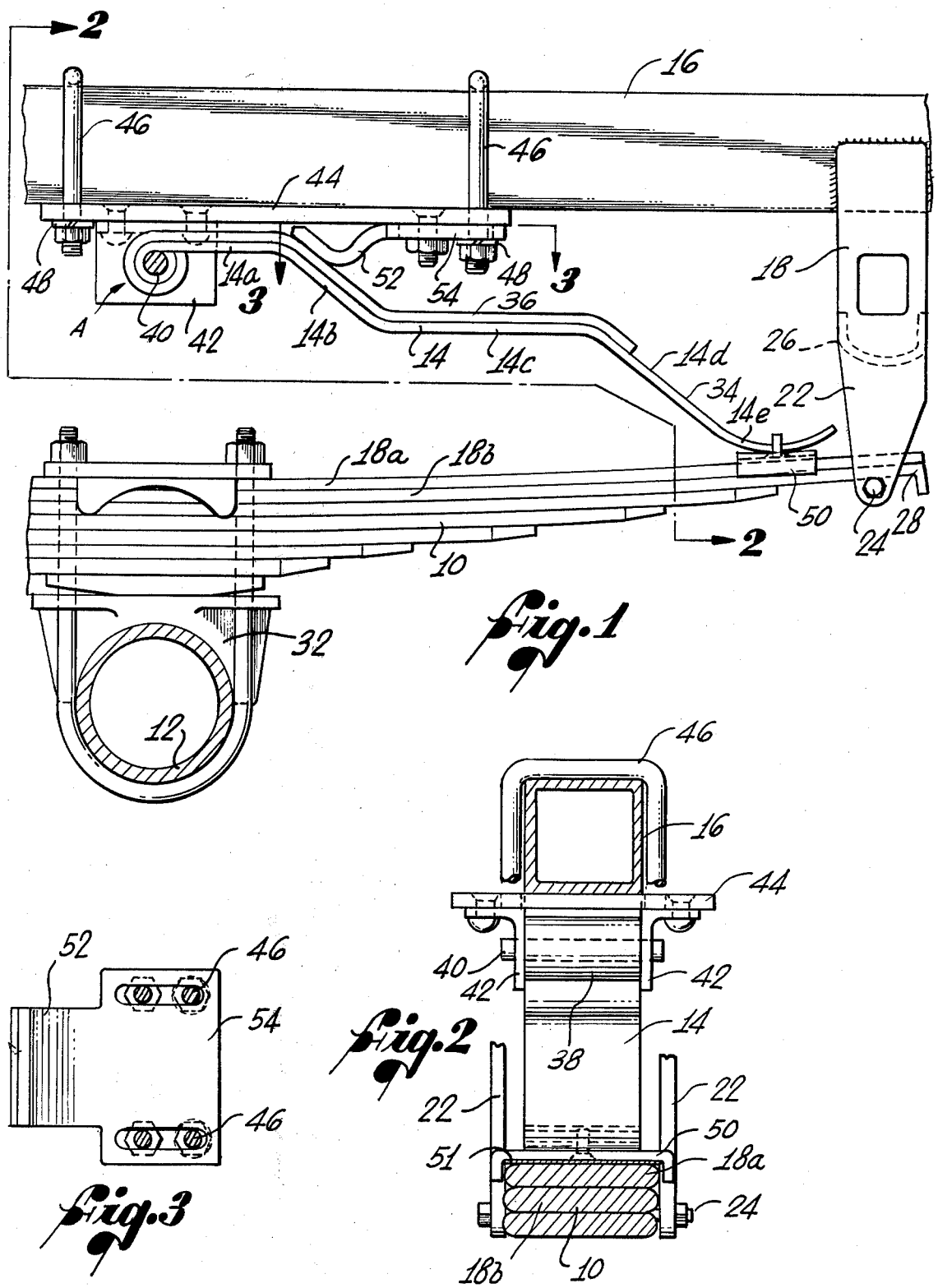

AUXILIARY VEHICLE SPRING FOR LIGHTLY LOADED CONDITIONS

RELATED APPLICATIONS

This application is a continuation-in-part of application Ser. No. 783,661, entitled VEHICLE SUSPENSION SYSTEMS HAVING AUXILIARY SPRING FOR LIGHTLY LOADED CONDITIONS filed on Apr. 1, 1977, now U.S. Pat. No. 4,175,772.

BACKGROUND OF THE INVENTION

The present invention relates to vehicle suspension systems, and more particularly to suspension systems that include an auxiliary spring on which a vehicle rides when lightly loaded.

Vehicles that are intended to carry heavy loads have suspension systems with appropriately high spring rates. When the vehicle is empty or only lightly loaded, the relatively small forces acting on the springs are not sufficient to produce significant deflections and the vehicle has an extremely rigid ride. The lack of effective spring action is not only jarring and uncomfortable, but is dangerous because an unsprung axle has poor traction.

While the above problems of heavy duty suspension systems are most commonly associated with trucks and semi-trailers, they are shared by other types of vehicles as well. Off-the-road vehicles, such as dune buggies, for example, are usually provided with very rigid springs in relation to their weight to withstand the rough treatment for which they are intended. When driven on smooth paved highways, their suspension systems are largely ineffective.

To overcome the above problems, some heavy duty suspension systems have been provided with auxiliary springs having a relatively low spring rate that are positioned between the frame of the vehicle and the main leaf springs. When the vehicle is lightly loaded, it is given a resilient ride by the auxiliary springs while the mainsprings remain relatively rigid. When heavily loaded, however, the auxiliary springs assume a fully flexed position and the vehicle rides on the mainsprings.

A suspension system, known as the "Empty Ride System" that includes generally U-shaped auxiliary springs for lightly loaded conditions is described in U.S. Pat. No. 3,194,580, issued to B. C. Hamlet on July 13, 1965. That system, however, requires specially designed hangers for the main leaf springs and, therefore, is not well suited for attachment to the many existing vehicles that are not equippped with auxiliary springs. Moreover, Hamlet's system, while used on many trucks, has not been adapted for use on off-the-road vehicles. Another problem associated with the Hamlet suspension system is that the configuration of the auxiliary springs includes a reverse bend, and the stresses on those springs are concentrated at the bend, thereby limiting their useful life.

The primary objective of the present invention is to provide a suspension system having improved and longer lasting auxiliary springs that can be readily added to a variety of existing vehicles despite variations in the configuration of the frames and springs of theose vehicles. Another objective is to provide a suspension system having auxiliary springs that is compact and requires a minimum space under the vehicle frame so as not to interfere with the action of the mainspring when the vehicle is heavily loaded or subjected to high shock loads.

SUMMARY OF THE INVENTION

The present invention comprises a vehicle suspension system for use with heavy loads or under off-road conditions that nevertheless provides a smooth, resilient ride under empty or lightly loaded conditions. It utilizes an auxiliary spring that extends beneath the frame of the vehicle toward a hanger and engages a stiffer mainspring, urging the mainspring toward the lower limit of its range of travel. The length of the auxiliary spring, and the space it requires is minimized by utilizing a plurality of overlapping auxiliary spring leaves. According to another aspect of the invention, a pivotal attachment of the auxiliary spring combined with a spacer permits the use of an auxiliary spring of uniform construction with a wide variety of vehicles.

The auxiliary spring extends continuously, i.e., without reverse bends or U-shaped formations, from a spring securement location toward the hanger to engage the top of the mainspring. When the vehicle is not heavily loaded, the auxiliary spring forces the mainspring downwardly within the hanger, and the vehicle is provided with a resilient ride by the flexing of the auxiliary spring, while the mainspring remains substantially rigid. When heavily loaded, however, the frame moves downwardly against the bias of the auxiliary spring to the fullest extent permitted by the hanger, and resiliency is then provided by the flexing of the mainspring.

In a preferred form of the invention, the auxiliary spring is formed by a first auxiliary leaf that extends from the frame toward the hanger and a shorter second auxiliary leaf that begins at the pivotal attachment and overlies a portion of the first leaf. The auxiliary spring is attached to the frame by a pivot pin that extends crosswise with respect to the frame and an eye formed by the auxiliary leaves that surround the pin. The auxiliary spring can engage to the mainspring by a slide plate with an anti-friction liner carried tangentially by an arcuate spring section positioned beneath the frame to control the position of the auxiliary spring where it, along with the pivot pin, is supported by an attachment plate clamped to the underside of the frame.

Other features and advantages of the present invention will become apparent from the following description, taken in conjunction with accompanying drawings which illustrate, by way of example, the principles of the invention.

BRIEF DESCRIPTION OF THE DRAWINGS

FIG. 1 is a fragmentary side elevational view, with portions in section, of an improved vehicle suspension system including an auxiliary spring and constructed in accordance with the present invention;

FIG. 2 is an end view of the suspension system, taken along the line 2—2 of FIG. 1; and FIG. 3 is a top elevation of the spacer of the suspension system taken as indicated by the line 3—3 of FIG. 1.

DESCRIPTION OF THE PREFERRED EMBODIMENT

A suspension system for trucks, trailers, off-the-road vehicles and the like, that embodies novel features of the present invention, shown in FIGS. 2 and 3 of the accompanying drawings, provides a relatively high spring rate when heavily loaded and a relatively low spring rate when lightly loaded. Viewed with respect to a single axle 12 of the vehicle, it includes a multi-leaf auxiliary spring 14 inserted between the mainspring 10 and the vehicle frame 16.

The ends of the mainspring 10 are slidably received by a pair of spaced-apart hangers 18 in the conventional manner (only one hanger being illustrated in the drawings). Each hanger 18 includes two parallel side legs 22 that extend downwardly from either side of the vehicle's frame 16, the legs being apertured to reduce weight. A horizontal pin 24 spans the opening at the lower ends of the legs 22 and a cross piece 26 (shown in phantom lines in FIG. 1) extends between the legs above the pin so that the range of vertical travel of the mainspring 10 is limited by the pin in its lowermost position and the cross-piece in its uppermost position. As the mainspring 10 flexes, its longest top leaves 18a and 18b slide through the hangers 18 to accommodate changes in horizontal dimension. Hooks 28 on the ends of the mainspring 10 prevent it from being withdrawn from the hangers 18 (only one such hook) being shown in the drawing). Longitudinal movement of the mainspring 10 is prevented, in the conventional manner, by a radius arm (not shown) and the axle 12 is attached to the center of the mainspring 10 by a mounting 32.

The components descreped above commonly form the basic original equipment of a vehicle suspension system having a single spring rate that is often too high for a safe and comfortable ride when the vehicle is empty or lightly loaded. This system is, however, modified in accordance with the present invention, without replacing the original components, by the addition of the auxiliary spring 14 readily provided for an existing vehicle of conventional design.

The auxiliary spring includes a first auxiliary leaf 34 located between the mainspring 10 and the frame 16, extending from a frame attachment point A toward one of the hangers 18. A second auxiliary leaf 36 extends from the attachment point A coextensively with the first leaf 34, but is shorter than the first leaf and does not extend as far toward the hanger 18.

At the attachment point A, both auxiliary leaves 34 and 36 are bent to form an eye which rotatably surrounds a pivot pin 40 that extends crosswise with respect to the frame 16 and transversely with respect to the vehicle. The pin 40 is supported by two vertical side plates 42 that extend downwardly from a flat, rectangular, horizontal attachment plate 44 to which they are bolted. To clamp the attachment plate 44 to the underside of the frame 16, two U-shaped bolt members 46 extend over the top and embrace the sides of the frame. Cross-pieces 48 connect the bottom ends of the bolt members 46 and press upwardly on the bottom of the attachment plate 44.

The pivot pin 40 and the eye 38 cooperate to form a spring securement device that pivotally attaches the auxiliary spring 14 to the frame 16. At the opposite end of the auxiliary spring 14 from the pivot pin 40, a U-shaped slide plate 50 is bolted to the underside of the longer auxiliary leaf 34 and engages the top of the mainspring 10 between the attachment point A and the hanger 18. The slide plate 50 has a liner 51 of an anti-friction material such as Teflon that reduces wear as the mainspring 10 and auxiliary spring 14 flex and move with respect to each other.

The shape of the auxiliary spring 14 (shown in FIG. 1) is such that a straight first section 14a extends horizontally from the pivot pin 40 along a portion of the underside of the attachment plate 44 toward the hanger 18, a second section 14b angles downwardly from the first section but still extends toward the hanger, a third section 14c extends from the second section parallel to the first, a fourth section 14d extends downwardly from the third section parallel to the second section, and an arcuate fifth section 14e extends from the fourth section further toward the hanger. The fifth section 14e has its convex surface facing downwardly, the slide plate 50 being attached tangentially to that convex surface.

A V-shaped spacer 52 is formed by one end of a spacer plate 54 (shown separately in FIG. 3) that is bolted to the underside of the attachment plate 44 and oppose part of the second section 14b of the auxiliary spring 14. The spacer 52 has the effect of slightly stiffening the auxiliary spring 14 by preventing the abutting part of the second section 14b from flexing. Accordingly, the spring rate of the auxiliary spring 14 can be adjusted, to some extent, to suit an individual vehicle by varying the size, position and configuration of the spacer plate 52.

Although the spring rate of the auxiliary spring 14 is substantially lower than that of the mainspring 10, it is high enough to lift the weight of the vehicle when empty, urging the mainspring against the pin 24 at the lower limit of its vertical travel. Accordingly, the empty vehicle rides on the auxiliary spring 14 while the mainspring 10 remains relatively rigid. Because of its relatively gentle curvature and the absence of any reverse bends or other sharp deformations, the auxiliary spring 14 can be expected to have a long operational life.

It should be noted that the auxiliary spring 14 must fit within the space available between the mainspring 10 and the frame 16 and must not interfere with the upward travel of the axle 12 relative to the frame under maximum load conditions. It is therefore necessary to minimize the size of the auxiliary spring 14 and especially to minimize its length so as to use as little space as possible, particularly in the area directly above the axle mounting 32. This objective is accomplished by the use of the multiple leaf auxiliary spring 14. In this preferred embodiment, there are, as explained above, two auxiliary spring leaves 34 and 36. The shorter of these leaves extends from the attachment point A into the begining of the fourth section 14d, encompassing the area of greatest spring stress.

An important feature of the invention is its adaptability to a variety of differently constructed vehicles. As described above and shown in the drawings, it is incorporated in a vehicle having a relatively small vertical distance between the axle 12 and the frame 16. If a greater vertical distance is presented by a particular vehicle, the configuration or position of the spacer 52 can be changed so that the entire auxiliary spring 14 is angled downwardly more sharply and its first section 14a is not parallel to the frame 16 and attachment plate 44. This adjustability of the auxiliary spring 14 is facilitated by its pivotal attachment to the frame 16. In addition, the curvature of the fifth section 14e of the auxiliary spring 14 permits a tangential engagement of the mainspring 10 regardless of the position of the auxiliary spring.

It will be appreciated from the foregoing that the present invention provides an auxiliary spring having a relatively low spring rate for lightly loaded conditions that can be readily added to a variety of existing leaf spring suspension systems without major modification. While a particular form of the invention has been illustrated and described, it will be apparent that various modifications can be made without departing from the spirit and scope of the invention.

I claim:

1. A suspension system for a vehicle comprising:
   a main leaf sring connected to at least one axle of said vehicle;
   hanger means attached to said vehicle for retaining said mainspring while permitting vertical travel thereof within a predetermined range;
   an auxiliary spring disposed between said frame and said mainspring to downwardly bias said mainspring toward the lower limit of said range of travel, said auxiliary spring comprising a first auxiliary leaf extending continuously along and beneath said frame toward said hanger and a second auxiliary leaf coextensive with a portion of said first auxiliary leaf;
   an attachment plate underlying a portion of said frame;
   clamp means for securing said attachment plate to said frame;
   a spacer supported by said attachment plate between said frame and said auxiliary spring;
   spring securement means for pivotally attaching said auxiliary spring to said frame at location spaced horizontally from said hanger means, said spring securement means comprising a pin extending crosswise with respect to said frame and an eye found by said first and second auxiliary leaves that surrounds said pin; and
   a slider plate secured to said first auxiliary leaf that slidably engages said mainspring, said slider plate including an anti-friction liner;
   said auxiliary spring having a spring rate substantially lower than that of said mainspring, whereby said vehicle rides on said auxiliary spring when lightly loaded but rides on said mainspring when heavily loaded.

2. A suspension system for a vehicle having a frame comprising:
   a main leaf spring connected to at least one axial of said vehicle;
   rigid hanger means attached to said vehicle for receiving and retaining said main spring while permitting vertical travel thereof within a fixed predetermined range;
   an auxiliary spring disposed between said frame and said main spring to downwardly bias said main spring toward the lower limit of said range, said auxiliary spring extending continuously along and beneath said frame toward said hanger;
   a spacer disposed between said auxiliary spring and an portion of said frame; and
   attachment means for securing said spacer and said auxiliary spring to said frame at a location spaced horizontally from said hanger means while permitting said auxiliary spring to flex at said spacer, said auxiliary spring being so positioned by said attachment means that it engages said main spring at a location between said attachment means and said hanger;
   said auxiliary spring having a spring rate substantially lower than that of said main spring, whereby said vehicle rides on said auxiliary spring when lightly loaded but rides on said main spring when heavily loaded.

3. A suspension system for a vehicle having a frame comprising:
   a main leaf spring connected to at least one axial of said vehicle;
   rigid hanger means attached to said vehicle for receiving and retaining said main spring while permitting vertical travel thereof with a fixed predetermined range;
   an auxiliary spring disposed between said frame and said main spring to downwardly bias said main spring toward the lower limit of said range, said auxiliary spring extending continuously along and beneath said frame toward said hanger;
   a spacer disposed between said auxiliary spring and a portion of said frame;
   attachment means for securing said spacer and said auxiliary spring to said frame at a location spaced horizontally from said hanger means while permitting said auxiliary spring to flex at said spacer; and
   a slider plate secured to said auxiliary spring that slideably engages said main spring between said attachment means and said hanger, said slider plate including an anti-friction liner;
   said auxiliary spring having a spring rate substantially lower than that of said main spring, whereby said vehicle rides on said auxiliary spring when lightly loaded but rides on said main spring when heavily loaded.

* * * * *

UNITED STATES PATENT AND TRADEMARK OFFICE
CERTIFICATE OF CORRECTION

PATENT NO. : 4,226,441

DATED : October 7, 1980

INVENTOR(S) : Albert J. Lampert

It is certified that error appears in the above-identified patent and that said Letters Patent are hereby corrected as shown below:

Column 1, line 52, "equippped" should be --equipped--;
line 64, "theose" should be --those--.

Column 3, line 22, delete ")" after "hook";
line 44, after "eye" insert --38--.

Column 5, line 7, after "vehicle" insert --having a frame-
line 15, delete the second "of";
line 16, delete "travel,";

Signed and Sealed this

Third Day of February 1981

[SEAL]

Attest:

RENE D. TEGTMEYER

*Attesting Officer*       *Acting Commissioner of Patents and Trademarks*

UNITED STATES PATENT AND TRADEMARK OFFICE
CERTIFICATE OF CORRECTION

PATENT NO. : 4,226,441
DATED : October 7, 1980
INVENTOR(S) : Albert J. Lampert

It is certified that error appears in the above-identified patent and that said Letters Patent are hereby corrected as shown below:

Column 5, line 44, "axial" should be --axle--.

Column 6, line 23, "axial" should be --axle--.

Signed and Sealed this

Fourteenth Day of April 1981

[SEAL]

Attest:

RENE D. TEGTMEYER

Attesting Officer    Acting Commissioner of Patents and Trademarks